United States Patent
Khandal et al.

(10) Patent No.: US 8,173,754 B2
(45) Date of Patent: May 8, 2012

(54) PROCESS FOR THE SYNTHESIS AND PREPARATION OF POLYMERIC MATERIALS FOR USE IN OPTICAL APPLICATIONS SUCH AS PLASTIC LENSES

(75) Inventors: Rakesh Kumar Khandal, Delhi (IN); Amita Malik, Delhi (IN); Geetha Seshadri, Delhi (IN); Gouri Shankar Jha, Delhi (IN); Mukti Tyagi, Delhi (IN)

(73) Assignee: Shriram Institute for Industrial Research, Delhi (IN)

( * ) Notice: Subject to any disclaimer, the term of this patent is extended or adjusted under 35 U.S.C. 154(b) by 354 days.

(21) Appl. No.: 12/304,601

(22) PCT Filed: Mar. 9, 2007

(86) PCT No.: PCT/IN2007/000094
§ 371 (c)(1),
(2), (4) Date: Jun. 15, 2009

(87) PCT Pub. No.: WO2007/144898
PCT Pub. Date: Dec. 21, 2007

(65) Prior Publication Data
US 2010/0016524 A1   Jan. 21, 2010

(30) Foreign Application Priority Data
Jun. 12, 2006 (IN) ............... 1398/DEL/06

(51) Int. Cl.
C08F 2/00 (2006.01)
C08F 30/04 (2006.01)
C08F 20/06 (2006.01)
C23C 16/06 (2006.01)
B05D 3/10 (2006.01)

(52) U.S. Cl. .. 526/75; 526/240; 526/317.1; 427/255.35; 427/312; 427/313

(58) Field of Classification Search .............. 526/75, 526/317.1, 240; 427/255.35, 312, 313
See application file for complete search history.

(56) References Cited

U.S. PATENT DOCUMENTS 4,182,821 A * 1/1980 Nagai et al. .......... 526/240
4,585,841 A * 4/1986 Eguchi et al. ......... 526/240
* cited by examiner

*Primary Examiner* — Michael M Bernshteyn
(74) *Attorney, Agent, or Firm* — The Webb Law Firm

(57) ABSTRACT

This invention relates to a process for the preparation of plastic material for use in optical lenses comprising the steps of: a) synthesizing lead acrylate by adding lead monoxide to NaoH, which is stirred to obtain a homogenous mixture, b) adding an inhibitor to such a monomer mixture; c) adding acrylic acid drop wise to such a monomer mixture so as to avoid the formation of by products, d) heating the mixture of step (c) to a temperature of 35 to 45° C. till a white precipitate of lead acrylate is obtained, e) filtering, washing and drying the precipitate, f) subjecting lead acrylate to the step of polymerization by stepwise heating.

8 Claims, No Drawings

PROCESS FOR THE SYNTHESIS AND PREPARATION OF POLYMERIC MATERIALS FOR USE IN OPTICAL APPLICATIONS SUCH AS PLASTIC LENSES

FIELD OF INVENTION

This invention relates to a process for the synthesis and preparation of polymeric materials for use in optical applications such as plastic lenses.

PRIOR ART

Glass, the conventional material for lenses, is rapidly being replaced by plastic lenses. The popular materials for plastic lenses are diethylene glycol bis allyl carbonate also known as CR-39) and polymethylmethacrylate. Because of the low refractive index (1.50) of these resins it is difficult to obtain a lenses of large aperture and high modification. Still other disadvantages are poor hardness and low impact strength.

Resins of high refractive indices such as polystyrenes (1.59) and polycarbonates (1.58) due to non uniformity of optical characteristics cannot be used as material for lenses.

Novel materials such as metal containing carboxylic acids of lead, barium and lanthanum have been used as radiation shielding materials but due to limitations of poor transparency and optical clarity could not be used for application of lenses.

OBJECTS OF THE INVENTION

An object of this invention is to propose a process for the synthesis and preparation of transparent polymeric materials for use in optical lenses.

Another object of this invention is to propose a process for the preparation of polymeric materials for use in optical lenses which have a higher refractive index in comparison to that of the known art.

A still another object of this invention is to propose a process for the preparation of polymeric materials for use in optical lenses which have a comparatively higher hardness.

Yet another object of this invention is to propose a process for the preparation of polymeric materials for use in optical lenses which have a higher impact strength in comparison to the known art.

A further object of this invention is to propose a process for the preparation of polymeric materials for use in optical lenses which is efficient.

Further object and advantage of this invention will be more apparent from the ensuing description.

DESCRIPTION OF INVENTION

According to this invention, there is provided a process for the preparation of plastic material for use in optical lenses comprising the steps of:
a) synthesizing lead acrylate by adding lead monoxide to 0.1 NaOH, which is stirred to obtain a homogenous mixture,
b) adding an inhibitor to such a monomer mixture;
c) adding acrylic acid dropwise to such a monomer mixture so as to avoid the formation of side products,
d) heating the mixture of step (c) to a temperature of 35 to 45° C. till a white precipitate of lead acrylate is obtained,
e) filtering, washing and drying the precipitate
f) subjecting lead acrylate to the step of polymerization by stepwise heating.

The process for the preparation invention comprises the step of synthesis of lead acrylate by using lead monoxide and acrylic acid to obtain lead acrylate, which is then subjected to the step of polymerization to obtain the polymeric material for use in the manufacture of the optical lenses.

More specifically, the process comprises in taking a solution of 0.1N NaOH and to which 1 to 1.5 mole of lead monoxide is added to form a homogenous mixture by stirring. Such a stirring is carried out at room temperature. Therefore, an inhibitor such as hydroquinone is added to the mixture and stirred. Preferably, 0.1 to 1.5 gms of hydroquinole is to added to the mixture.

The next step in the process consists of the dropwise addition of acrylic acid to the homogenous mixture. Preferably, 2 to 2.5 moles of acrylic acid is added to the homogenous mixture over a period of 45 mins. to 1 hour. An exothermic reaction occurs upon addition of acrylic acid to the mixture. Thus to control the temperature, acrylic acid is added dropwise, or else side products may be formed. Such an addition is carried out under stirring conditions.

The mixture is then heated under reflux conditions to a temperature of between 35 to 45° C. If the temperature is above 45° C., a coloured product is obtained. If the temperature is less than 35° C., the reaction does not take place. The heating is carried out for a period of 1 to 1½ hours to obtain a white precipitate of lead acrylate.

The lead acrylate is filtered, repeatedly washed with acetone for removal of moisture, and then dried. Presence of moisture will affect the quality of the lens to be cast from the material. Finally, lead acrylate is dried in an air oven at a temperature of 85 to 90° C. for 3 to 5 hours.

Such a lead acrylate is subjected to the step of polymerization. The step of polymerization comprises in polymerizing 5 to 15% by weight of lead acrylate to the total composition in the presence of 4 to 5% by weight of cinnamic acid to the total composition and 75 to 92% by weight of acrylic acid to the total composition. A cross linking agent such as styrene is added and in an amount of 60 to 66% by weight. Polymerization is carried out in the presence of an initiator such as isopropyl peroxide and subjected to stepwise heating. Thus, the stepwise heating comprises in heating from 42 to 60° C., over a period of 1 hour, heating from 60 to 90° C. over a period of 1 hour and then retained at 90° C. for a period of approximately 12 hours. The cast lens had the following properties

| | |
|---|---|
| Refractive index | 1.557 |
| Abbe member | 37 |
| Transmittance | >90% |
| Shore D hardness | 86 to 90 |
| Impact strength | Passed FDA standards |

Further objects and advantages of this invention will be more apparent from the ensuing example, wherein the example is only illustration of the invention and not to be constructed as a restriction on the scope of the invention.

EXAMPLE 1

111.5 gms of lead monoxide is taken in 0.1 NaOH and the mixture stirred in a round bottom flask for 30 minutes at room temperature, 72 gms of acrylic acid is then adding by a dropping funnel and a period of 1 hour. The mixture is heated under reflux conditions to 35° C. for 1 hour. The yield was 93% of lead acrylate after filtration, washing and drying.

0.16 gms of lead acrylate is added 0.5 gms of cinnamic acid and 35.5 gms of acrylic acid to form a monomer mixture. Such a monomer mixture was subjected to the step of polymerization by adding 90 gms of styrene and 2.5 gms of isopropyl peroxide.

The mixture is poured into a mould and kept in an oven at 45° C. for 1 hour. The mixture is then subjected to stepwise heating by heating to 60° C. over a period of 1 hour and then heated to 90° C. over a period of 1 hour, and then kept at 90° C. for 12 hours. The lens is cast, which was clear and colourless, and had the following properties:

| Refractive index | 1.548 |
| Abbe member | 37 |
| Transmittance | 92% |
| Shore D hardness | 88 |
| Impact strength | Passed FDA standards |

It is to be noted that the present invention is susceptible to modifications, adaptations and changes by those skilled in the art. Such variant embodiments employing the concepts and features of this invention are intended to be within the scope of the present invention, which is further set forth under the following claims:

We claim:

1. A process for the preparation of plastic material for use in optical lenses comprising the steps of:
   a) adding lead monoxide to NaOH, which are stirred to obtain a homogenous mixture;
   b) adding an inhibitor to the homogenous mixture;
   c) adding acrylic acid drop wise to the homogenous mixture so as to avoid forming by side products;
   d) heating the mixture of step (c) to a temperature of 35 to 45° C. until a white precipitate of lead acrylate is obtained;
   e) filtering, washing and drying the precipitate;
   f) subjecting the lead acrylate to the step of polymerization by stepwise heating.

2. The process as claimed in claim 1 wherein 1 to 1.5 mole of lead monoxide is added to 0.1N of the NaOH and stirred at room temperature to form the homogenous mixture.

3. The process as claimed in claim 2 wherein 0.1 to 0.15 grams of the inhibitor is added to the homogenous mixture and stirred.

4. The process as claimed in claim 3 wherein 2.0 to 2.5 moles of the acrylic acid is added dropwise to the mixture over a period of 45 minutes to 1 hour.

5. The process as claimed in claim 4 wherein the mixture after the dropwise addition of the acrylic acid is heated under reflux to a temperature of 35 to 45° C. to form the white precipitate of the lead acrylate.

6. The process as claimed in claim 5 wherein the lead acrylate is filtered, washed and dried and then subjected to the step of polymerization.

7. The process as claimed in claim 6 wherein the step of polymerization comprises combining 5 to 15% by weight of the lead acrylate to the total composition, 4 to 5% by weight of cinnamic acid to the total composition, 75 to 92% by weight of acrylic acid to the total composition and 60 to 66% by weight of a cross-linking agent to the total composition to form a monomer mixture.

8. The process as claimed in claim 7 wherein the monomer mixture is subjected to a stepwise heating by heating at 42 to 60° C. over a period of 1 hour followed by heating at 60 to 90° C. for 1 hour and then retained at 90° C. for 12 hours.

* * * * *